J. D. SARVEN.
Hub.
No. 17,520. Patented June 9, 1857.
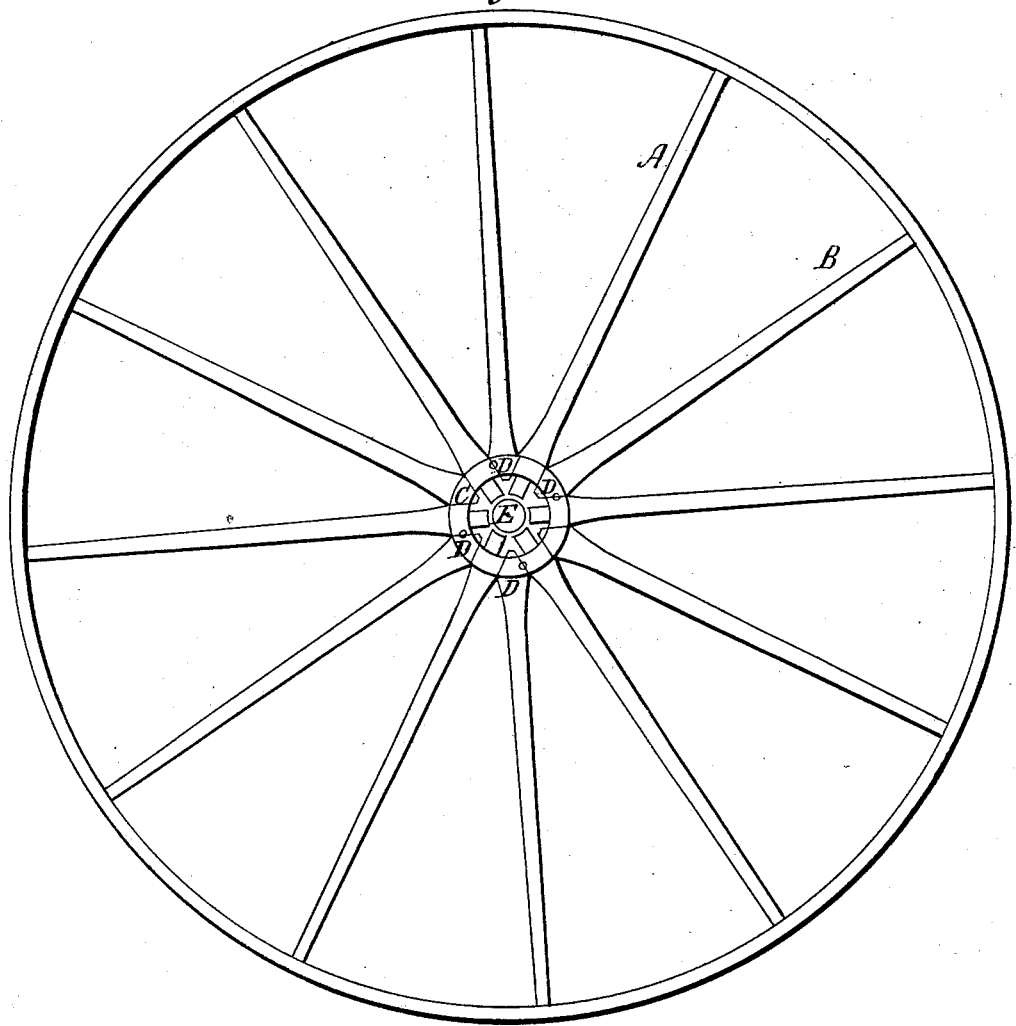
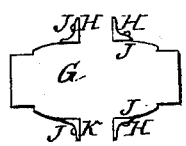
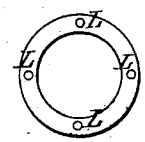
Witnesses.
Inventor.

UNITED STATES PATENT OFFICE.

JAMES D. SARVEN, OF COLUMBIA, TENNESSEE.

IMPROVED CARRIAGE-WHEEL.

Specification forming part of Letters Patent No. 17,520, dated June 9, 1857.

*To all whom it may concern:*

Be it known that I, JAMES D. SARVEN, of Columbia, in the county of Maury and State of Tennessee, have invented a new and Improved Mode of Constructing Carriage-Wheels; and I do hereby declare that the following is a full and exact description thereof, reference being had to the accompanying drawings, and to the letters of reference marked thereon.

The object of my invention is to provide a wheel with wooden hub that will admit of a greater number of spokes in each wheel than can be used by the old method on account of the hub being cut away by mortises to receive a number of spokes that would be sufficiently near together at the rim of wheel to prevent it from being flattened between the spokes by fast driving, thereby loosening the tire and rendering the whole wheel comparatively weak. It also consists in giving greater strength to the spokes at and near the hub and to the hub itself.

The nature of my invention consists in the employment of flanged collars of metal to be used in combination with a wooden hub, as follows: I use in general a very small hub of wood, much smaller than in the old style of wheel, and instead of making sixteen mortises, as is common for spokes, I make in general nine or ten for the tenons somewhat larger than in the ordinary way, and between each of these spokes I make a mortise in the hub about three-eighths of an inch deep and insert spokes wedge-shaped, as shown by the drawings accompanying this specification. After the spokes are all fitted I put the flanged collar on the back part of the hub, the collar fitting closely to the hub and serving to strengthen and support the same while the flange fits closely to the back of the spokes. I in general make three screw-holes in this collar next the hub, into which I insert screws, so that the collar will retain its position in case the hub should shrink in the flange that fits against the spokes. I in general make five one-fourth-inch holes, into which I cut a thread to receive screws. After the back flanged collar is secure I put on the front flanged collar on the front of hub, it fitting closely to the hub, but is not screwed thereto, the flanges fitting closely to the front of the spokes. In these flanges there are five holes. Opposite those in the back flange I now bore five one-fourth inch holes through the spokes and insert screws, driving both flanges firmly against the spokes, thereby securing all the spokes firmly in their proper place. For a very light wheel made in the ordinary way it is customary to make the hub three and one-half inches in diameter, and sixteen spokes seven-eighths of an inch; axle thickness of axle-box three-sixteenths of an inch, and the end of spokes one-sixteenth of an inch from box, leaving a tenon one and one-sixteenth inch long, scant three-eighths of an inch thick by seven-eighths of an inch wide. When the tire is put on the wheel, it is in part the weight applied to the lever, the spoke being the lever, the front outer surface of the hub the fulcrum, and the greatest strain is on the tenons at the hub, at which point I get sixteen times scant three-eighths of an inch, or about five and one-half inches bearing and strength of timber against the front and also against the back of mortises in hub, with length of tenon one and one-six-sixteenth of an inch. In using the flanged collars for the same size and weight of wheel I use a hub three inches in diameter, of wood, and flanges projecting three-fourths of an inch from the outer surface of hub and bearing against the spokes. Allowing, as in the other case, one and three-eighths of an inch space for the box gives a length of tenon from top of flanges to box of one and nine-sixteenths of an inch on the ten spokes mortised in the hub in the ordinary manner, and as the whole thickness of the spokes bear against the flanges I get, if the spokes are scant three-fourths of an inch thick, (the usual thickness,) ten times three-fourths of an inch when twenty spokes are used in each wheel, or about seven inches bearing and strength of timber at top of flanges and what is equal to one and nine-sixteenths of an inch length of tenon, and on the ten wedge-shaped spokes I get what is equal to one and one-eighth of an inch length of tenon, with seven-inch bearing and strength of timber at outside of flanges, with spokes sufficiently near together at rim of wheel to prevent indentations being made by fast driving over rough roads, while the length of tenon in the hub prevents the spokes from being wrenched out of hub or breaking at hub in turning short corners or suddenly dropping into road-ruts, as experience shows frequently to be the case. This arrangement can also be applied to a wheel with the ordinary number of spokes, thereby preventing the tenons at hub from breaking off.

It has been and is customary to give a light wheel one-eighth of an inch dish. The tire causes about three-eighths of an inch additional dish in a four-foot wheel, making one-half inch. There is consequently considerable strain on the tenons at the hub, and if the spokes shrink in the least they must work in the hub. To prevent this, the tire is reset; but the tenons on the spokes, being straight or of the same thickness their whole length, they are not tightened sidewise, and if the hub is hard, although the tenons are tapered on their back edge, the shoulders on the spokes either split or prevent the spokes from settling in the hub, and an increased dish is given to the wheel, and the back part of the tenons consequently do not fit closely against the back part of hub at its outer surface. It is evident that there is now a great strain against the front part of the tenons, which frequently breaks the grain of the wood and renders the spokes worthless. The propriety of fastening the back collar to the hub is now evident. In this case, when the tire is reset, the front flanged collar not being fastened to the hub, the screws which pass through the spokes and flanges being tightened draws the back part of the spokes firmly against the back flange, and the front of spokes have so great bearing-surface against the front flange, as already shown, that there is comparatively little strain on the portion of tenons mortised in the hub, and the dish of the wheel is very little affected by resetting the tire. It is well known that after a wheel is dished to a certain point the spokes will be drawn out of the hub, instead of being tightened. By resetting the tire when the flanged collars are used the spokes can be tightened sidewise by cutting slightly off the ends of the wedge-shaped spokes at hub while the tire is off the wheel, and above the surface of the hub they can be tightened by screwing up the flanges if the spokes shrink edgewise.

I am aware that flanges to secure spokes in metallic hubs have been used, but with different arrangement for axle-box and spokes differently fastened in hub; but I believe flanged collars in combination with a wooden hub new and free at least from some of the objections to metallic hubs. It is lighter, and wood being a non-conductor, the lubricating material put on the axle does not in a summer sun become heated and absorbed, as in a solid mass of iron. I can use the common axle and axle-box, which any blacksmith can repair, if necessary, in any part of the country, and can also repair any part of my arrangement, although I design using principally malleable cast-iron for the flanged collars.

Figure 1 is a front view of wheel with the front part of the hub removed, in order to show the manner in which the spokes are inserted into the hub, the shaded spokes A being those with long tenons, and the spokes B (not shaded) represent those that are wedge shaped at the hub. C represents the flange that bears against the spokes, and D D D D the screw-holes in flange. E represents the opening in hub to receive the axle-box, and F the rim of wheel.

Fig. 2 is a side view of the hub with the flanged collars attached. G represents the hub; H H, the back flanged collar; I I, the screws that pass through the collar into the hub to hold the collar in position. J J represents the front flanged collar; K K, the screws that pass through the spokes and back and front flanges, screwing into the back flange, as already described.

Fig. 3 represents the shape of the flanged collars, viewed from the side.

Fig. 4 represents the face of the flanges or that portion that bears against the spokes, and L L L L the screw-holes.

What I claim as my invention, and desire to secure by Letters Patent, is—

1. The improvement in carriage-wheels, which consists in the employment of flanged metallic collars, as described, or other equivalent devices, in combination with a wooden hub, and these in combination with the arrangement of the spokes at the hub, as described, by which means strength and support are given both to the hub and to the spokes at and near the hub, and by which means I am enabled to use any desired number of spokes in each wheel, thereby preventing indentations being made in the rim of wheel between the spokes, and by which means I am also enabled to use a much smaller hub than those in general use, and at the same time retain a sufficient degree of strength at the hub, the whole being constructed and arranged substantially as and for the purposes set forth.

2. The flanged collars, as described, or other equivalent devices, when used in combination with a wooden hub if the spokes are arranged as herein set forth, or if arranged in any other manner.

JAMES D. SARVEN.

Witnesses:
 J. R. LAMB,
 A. BARR.